United States Patent [19]
Clark et al.

[11] Patent Number: 5,160,455
[45] Date of Patent: Nov. 3, 1992

[54] FABRICATION OF HOMOGENOUS SOL-GEL DERIVED MULTIPHASE MATERIALS USING GELLING CONTROL AGENTS

[75] Inventors: David E. Clark; Kenneth W. Wistrom, both of Gainesville, Fla.

[73] Assignee: University of Florida, Gainesville, Fla.

[21] Appl. No.: 127,613

[22] Filed: Sep. 8, 1987

Related U.S. Application Data

[63] Continuation-in-part of Ser. No. 704,913, Feb. 25, 1985, abandoned.

[51] Int. Cl.$^5$ .............................................. B01J 13/00
[52] U.S. Cl. .......................... 252/315.7; 252/315.01; 252/315.6; 501/12
[58] Field of Search ............. 252/315.01, 315.6, 315.7; 501/12; 423/626, 630

[56] References Cited

U.S. PATENT DOCUMENTS

| | | | |
|---|---|---|---|
| 2,487,065 | 11/1949 | Milliken, Jr. | 252/315.01 X |
| 2,636,865 | 4/1953 | Kimberlin, Jr. | 252/315.7 |
| 2,665,258 | 1/1954 | Lebeis, Jr. | 252/315.6 X |
| 3,753,744 | 8/1973 | Komaru et al. | 501/100 X |
| 3,791,808 | 2/1974 | Thomas | 501/12 X |
| 3,944,658 | 3/1976 | Yoldas | 423/626 |

*Primary Examiner*—Richard D. Lovering
*Attorney, Agent, or Firm*—Jacobson, Price, Holman & Stern

[57] ABSTRACT

A method of preparing a composite of a metal oxide matrix with reinforcement particles distributed therein in gel form, by preparing a sol of a metal oxide of $Al_2O_3$, $SiO_2$, MgO, $ZrO_2$, $Y_2O_3$ and mixtures thereof, bringing the sol near the point of gelation, adding reinforcement material consisting of $Al_2O_3$, SiC, $SiO_2$, MgO, $ZrO_2$, $Y_2O_3$ and mixtures thereof in particulate form in an amount from about 5% by volume to about 90% by volume, and adding a control gelling agent in the form of an aqueous solution of a metal salt consisting of aluminum nitrate, magnesium nitrate, zirconium nitrate, chromium nitrate, silicon nitrate, neodymium nitrate and mixtures thereof in an amount corresponding to from about 1% to about 5% by weight of the metal salt based on the metal oxide in the sol to promote controlled gelation.

7 Claims, 1 Drawing Sheet

FIG. 1
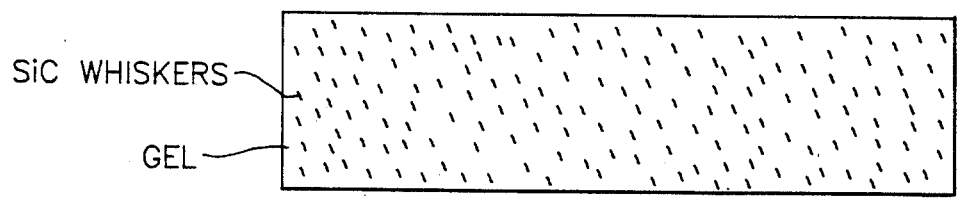
FIG. 2
FIG. 3
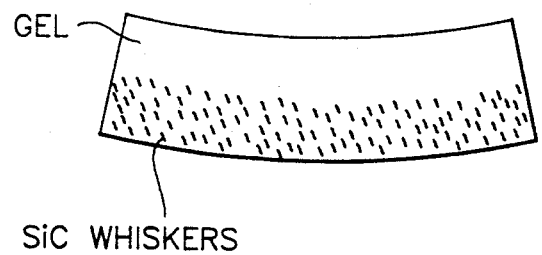
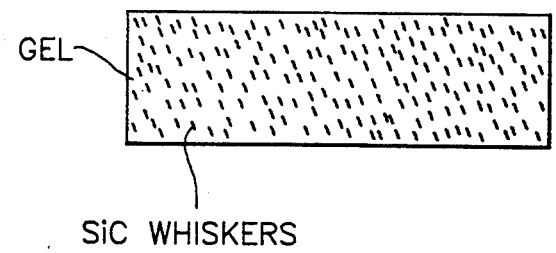

FABRICATION OF HOMOGENOUS SOL-GEL DERIVED MULTIPHASE MATERIALS USING GELLING CONTROL AGENTS

This application is a continuation of application Ser. No. 704,913, filed Feb 25, 1985 now abandoned.

BACKGROUND OF THE INVENTION

1. Field of the Invention

The present invention relates to a novel method for fabrication of homogeneous sol gel-derived multi phase materials, especially ceramics, and gelling control agents therefor, and more particularly relates to a novel method for fabrication of homogeneous sol gel derived $SiC/Al_2O_3$ composites and the particular gelling control agents therefor.

2. Description of the Prior Art

This invention provides a unique way to fabricate a variety of sol gel derived materials that require homogeneous mixing of two or more constituents. These are referred to as multi-phase or composite materials where the gel provides a matrix in which the reinforcement materials are distributed and held. Sol gel processing is known as a potentially good method for preparing such multi-phase materials, see copending applications Ser. Nos. 583,737; 583,738; 583,743; and 583,745 filed Feb. 27, 1983, all of the stated applications being now abandoned. Fabrication of the composite is accomplished by mixing fibers, whiskers or particulates into a low viscosity sol just prior to gelation. Upon gelation, these reinforcement materials ar "frozen" into the structure. Subsequent drying and firing will result in a strong and tough ceramic composite. A significant problem with this method of fabrication is that the settling of the dense reinforcement materials due to gravity can lead to their segregation prior to gelation. If this occurs, the resulting dried and fired ceramic composites will not be homogeneous. That is, the reinforcement materials will not be distributed uniformly throughout the matrix. In order to prevent segregation, the reinforcement materials must be mixed with the sol just prior to elation. This degree of control is not easy to maintain, even on a laboratory scale.

SUMMARY OF THE PRESENT INVENTION

The foregoing problem is overcome by the novel method of the present invention which utilizes gelling control agents that promote gelling rapidly in a more controlled manner. The method of the present invention is carried out by forming a sol from a metal alkoxide, the precursor for the metal oxide ceramic material, by following a procedure as described in the aforementioned applications here incorporated by reference or any known procedure and at the point of adding the reinforcement to the sol, adding a gelling agent in the form of a liquid that will promote gelling in seconds, freezing the reinforcement in place. These and other advantages of the present invention will become apparent in the following detailed description.

BRIEF DESCRIPTION OF THE DRAWING

In the drawing:

FIG. 1 shows schematically a metal oxide sol with reinforcement uniformly distributed therein immediately after mixing and casting;

FIG. 2 shows schematically the result of gelation, aging and drying where a gelling agent as taught by the present invention is not used; and FIG. 3 show schematically the result of gelation, aging and drying when a gelling agent as taught by the present invention is used.

DETAILED DESCRIPTION OF PREFERRED EMBODIMENTS

According to the unique method of the present invention, fabrication of ceramic composites based on the sol gel technique provides more flexibility in the processing. Basically, the method is the same up through the point of adding the reinforcement to the sol. That is, a procedure as described in the aforementioned application is used, or any known procedure is used. Upon uniform mixing of the reinforcement materials and the sol, a gelling agent is added in the form of a liquid or solid powder. The reinforcement material may be present from 50% to 90% by volume of the final composite. Within minutes, gelation of the mixture will occur, freezing the reinforcement materials into the matrix prior to gravity segregation.

Essentially, the invention contemplates any ceramic oxide material including $Al_2O_3$, $SiO_2$, MgO, $ZrO_2$, $Y_2O_3$ and mixtures thereof. Also, the reinforcement material includes SiC, C, $SiO_2$, $Al_2O_3$, $ZrO_2$, $Y_2O_3$, MgO and mixtures in suitable particulate form, including powders, fibers and whiskers, all of which are known and available commercially. The size of the particulate is what is presently commercially available and is well known to one skilled in the art.

One example is cited below for the alumina gel silicon carbide whisker system. The gelation control agent has also been demonstrated for the alumina gel-silica particulate system as well and it is believed that it will work equally well for sol-gel derived composites as noted.

The gelling control agent selected for the example is aluminum nitrate $(Al(NO_3)_3)$. Other gelling control agents that have been tested include $Nd(NO_3)_3$, $Mg(NO_3)_2$, and $Cr(NO_3)_3$. The aluminum nitrate is a particularly good choice for alumina gels when purity is important. During firing, it decomposes into alumina. It is believed that other salts of Al, Mg, Cr, Nd, Si and Zr, such as nitrates, sulfates and chlorides, to name a few, will also work. The gelling agent is added to the sol in an amount from about 0.1% to about 5% by weight based on the metal oxide base of the ceramic. Preferably 2% by weight is used.

If no gelling agent is used, gelling will normally occur some indefinite time after about 15 minutes, offering no possibility of control. Also, when gelling does begin, it begins with a film on the surface and proceeds progressively down through the liquid sol. Hence, all parts of the sol do not gel at the same time. Using gelling agents according to the present invention, gelling may be initiated within one to ten minutes and preferably within 5 minutes in a much more controlled fashion. The gelling occurs uniformly proceeding throughout the liquid sol freezing the reinforcement in place. A further advantage of using the gelling agents is that gelation can be initiated at greater water contents.

Essentially, the gelling agents of the present invention must be soluble in water or the precursor sol and must decompose to yield a metal oxide or metal for incorporation homogeneously into the gel, preferably on a molecular basis.

SPECIFIC EXAMPLE

Aluminum sec-butoxide was hydrolyzed by reacting it with 100 moles $H_2O$/mole alkoxide at 95° C. for three days using a 2000 ml round bottom flask, a condenser column and an egg-shaped, magnetic stirrer. Acids (0.070 m HCl+0.0233 m $HNO_3$)/mole alkoxides) were added to aid in the hydrolysis. Glycerol was added to reduce cracking and to impart flexibility to the dried gel. The glycerol was added in the ratio of 10 ml to 1000 ml of sol.

One thousand ml of clear, hydrolyzed alumina sol was concentrated to 300 ml, using a hot plate and stirrer. Six grams of Arco SiC whiskers (20 vol % SiC, based on the final composition) were mixed with 60 ml ethyl alcohol, and the mixture was stirred on a hot plate. The SiC alcohol mixture was poured into the sol-gel and vigorously stirred. Approximately 25 ml of the sol-gel-SiC-alcohol mixture was poured into a 60 ml Teflon ® container and then into a plastic disc. Fifteen hundreds (0.15) g of a mold release such as *Union Carbide R*-272 was added to the bottom of the disc to prevent adherence and reduce cracking. Aluminum nitrate was dissolved in 10 ml distilled water. Between 1 and 1.5 ml aluminum nitrate solution were added to the solution in the plastic disc to promote gelation, corresponding to 2% to 3% wt aluminum nitrate, based on the alumina ($Al_2O_3$) in the sol. Two control samples without gelling agents were also cast. The plastic disc was polystyrene, the preferred mold material, although polyethylene or PTFE can be used.

The samples were disk shaped approximately 87 mm in diameter and 2 mm thick after gelation see FIG. 1. During drying, all of the samples shrank by about 20%, based on their original dimensions. However, the shrinkage of the samples without $Al(NO_3)_3$ resulted in severe distortion, see FIG. 2. This type of distortion is well known in the literature and is due to differential shrinkage between the top and the bottom of the sample. The final shape resembled that of a potato chip. In contrast, the samples with the $Al(NO_3)_3$, see FIG. 3, maintained their same shape during drying. Close inspection of the samples revealed that segregation of the SiC whiskers had occurred in the samples without the gelling agent, see FIG. 2, but not in the samples with the gelling agent, see FIG. 3. The segregation problem of FIG. 2 was not remedied by firing to high temperatures.

Having now fully described the invention, it will be apparent to one of ordinary skill in the art that changes and modifications can be made which do not depart from the spirit and scope of the present invention as set forth herein.

What is claimed is:

1. A method of preparing a gel of a metal oxide selected from the group consisting of $Al_2O_3$, $SiO_2$, MgO, $ZrO_2$, $Y_2O_3$ and mixtures thereof comprising preparing a sol of metal oxide from a metal alkoxide,
   reducing the liquid content of the sol, and then
   adding an aqueous solution of a metal salt in an amount corresponding to from about 0.1% to about 5% by weight of metal salt based on the metal oxide in sol to promote controlled gelation.

2. The method according to claim 1 wherein said metal alkoxide is aluminum sec-butoxide.

3. A method of preparing a composite of a metal oxide matrix with reinforcement particles distributed therein in gel form, comprising preparing a sol of metal oxide from a metal alkoxide,
   reducing the liquid content of the sol,
   adding reinforcement material selected from the group consisting of $Al_2O_3$, SiC, $SiO_2$, MgO, $ZrO_2$, $Y_2O_3$ and mixture thereof in particulate form in an amount from about 5% by volume to about 90% by volume, and then
   adding a control gelling agent in the form of an aqueous solution of a metal salt in an amount corresponding to from about 0.1% to about 5% by weight of the metal salt based on the metal oxide in the sol to promote controlled gelation.

4. The method according to claim 3 wherein said metal alkoxide is aluminum sec-butoxide.

5. The method of claim 3 wherein the control gelling agent is a nitrate selected from the group consisting of aluminum nitrate, magnesium nitrate, zirconium nitrate, chromium nitrate, yttrium nitrate, neodymium nitrate and mixtures thereof.

6. The method of claim 3 wherein the control gelling agent is present in an amount corresponding to about 2% by weight of the metal salt based on the metal oxide in the sol.

7. The method of claim 3, wherein the metal oxide is $Al_2O_3$, the reinforcement material is SiC and the control gelling agent is aluminum nitrate.

* * * * *

UNITED STATES PATENT AND TRADEMARK OFFICE
CERTIFICATE OF CORRECTION

PATENT NO. : 5,160,455
DATED : November 3, 1992
INVENTOR(S) : David E. Clark et al.

It is certified that error appears in the above-identified patent and that said Letters Patent is hereby corrected as shown below:

Column 1, line 5, after the Title, insert:

--This invention was made with Government support under F49620-83-C-0072 awarded by the Air Force. The Government has certain rights in this invention.--

Signed and Sealed this

Sixteenth Day of November, 1993

Attest:

BRUCE LEHMAN

Attesting Officer

Commissioner of Patents and Trademarks